(No Model.) 2 Sheets—Sheet 2.
L. C. PARKER.
CARBURETOR.
No. 435,856. Patented Sept. 2, 1890.
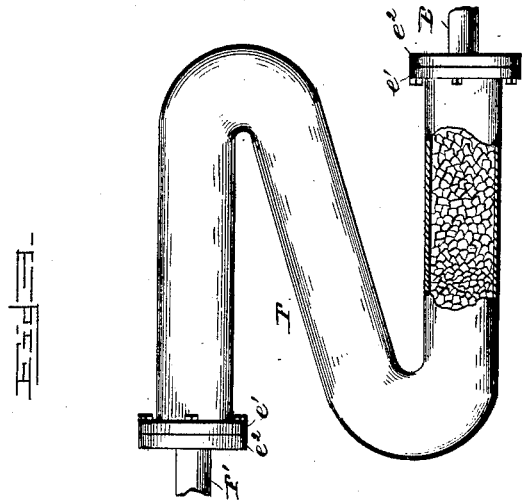
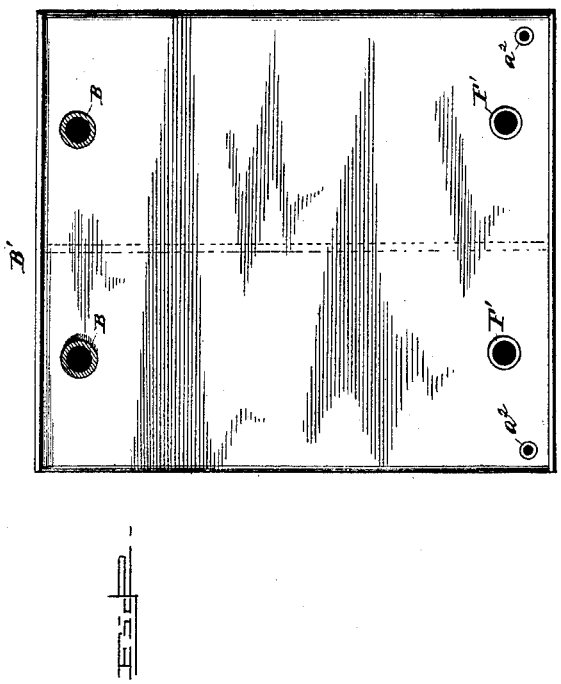
Witnesses
Paul W. Stevens
Mercer Myers
Inventor
Lewis C. Parker
By Myers & Co.
Attorneys.

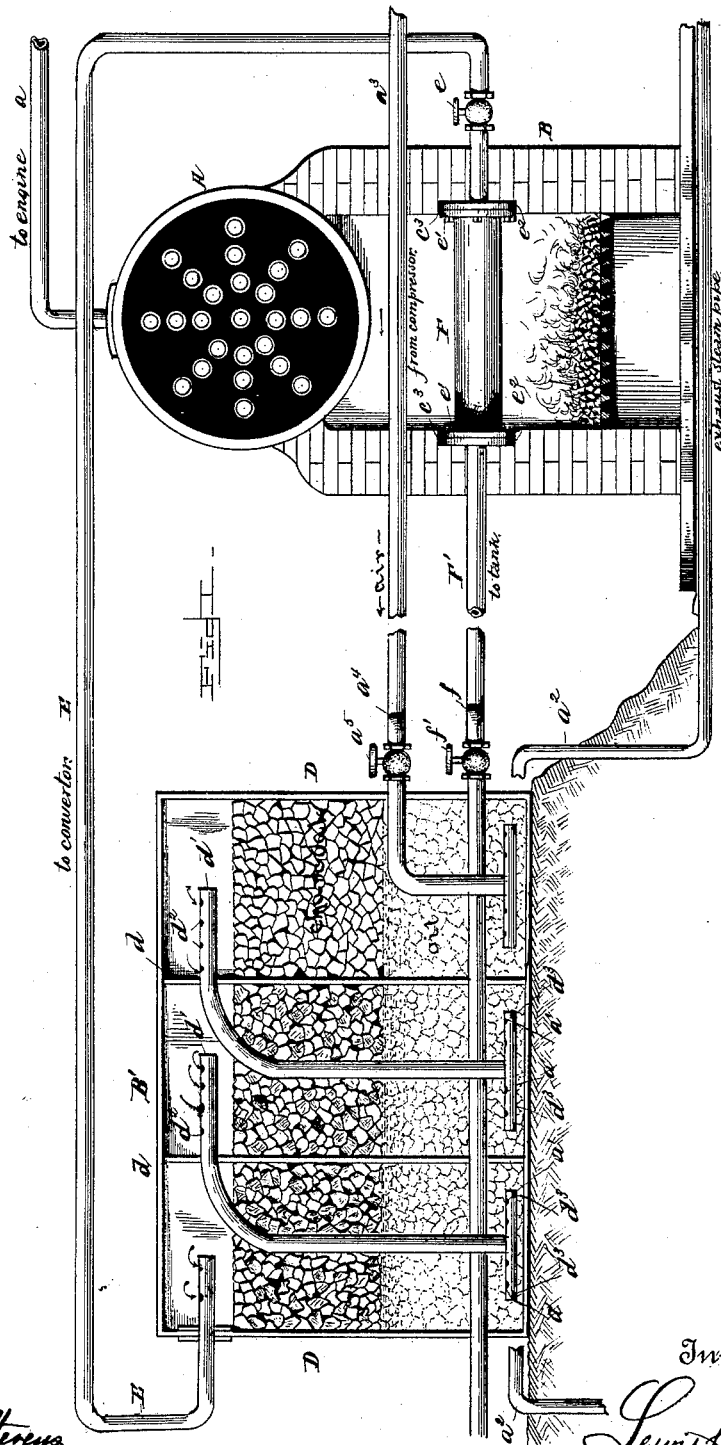

UNITED STATES PATENT OFFICE.

LEWIS C. PARKER, OF KANSAS CITY, MISSOURI.

CARBURETOR.

SPECIFICATION forming part of Letters Patent No. 435,856, dated September 2, 1890.

Application filed May 2, 1890. Serial No. 350,299. (No model.)

*To all whom it may concern:*

Be it known that I, LEWIS C. PARKER, a citizen of the United States of America, residing at Kansas City, in the county of Jackson and State of Missouri, have invented certain new and useful Improvements in Carburetors, of which the following is a specification, reference being had therein to the accompanying drawings.

My invention pertains to certain new and useful improvements in gas-making machines; and it consists of the novel combination of the parts, whereby a very efficient gas-machine is produced.

In the accompanying drawings, Figure 1 is a side elevation of my invention complete, parts being broken away and in section. Fig. 2 is an end view of the oil-chambers; and Fig. 3 is a plan view, parts being broken away, of the converter.

In carrying out my invention I employ boiler A and its furnace B, the boiler furnishing steam through pipe $a$ to an engine (not shown) operating the air-compressor, (not shown,) which forces the air through pipe $a^3$, through the furnace, and into the oil-chambers D D, said pipe being formed into a fork or two branches at $a^4$, each branch having a valve $a^5$ thereon. Tank B' has formed therein a double series of chambers D D by means of partitions or walls $d\ d$. These chambers are filled with charcoal, serving as a purifier for the gas, said charcoal being partly submerged with oil or petroleum, and are connected by means of approximately inverted-L-shaped pipes $d'\ d'$, having their horizontal ends perforated at $d^2\ d^2$ and opening into the preceding chamber at the top thereof, and their lower ends opening into horizontal branch pipes $d^3\ d^3$, perforated at $a'\ a'$ at the bottom of the succeeding chamber. Thus it will be seen that as the air is forced from the bottom to the top of each chamber of the series through the oil and charcoal it becomes fully saturated therewith. Pipe E, which conveys the gas from the last chamber in the series to the converter F, has a valve $e$ near its connection therewith. The converter F is formed in an approximately N shape and is made larger than the supply-pipe E, said converter being filled with coke, marble-dust, or iron filings, or all three, and may have a wire-gauze diaphragm at its outflow end to purify the gas of all particles as it passes into pipe F', which conveys it through the oil chambers or compartments D D to the tank or receptacle, (not shown,) said pipe also being divided at $f$ into two branches connecting with the two series of chambers D D, and are each supplied with a valve $f'\ f'$. Converter F has flanges $e'$ on its ends, to which the head $e^2$ is secured by means of bolts, the pipes E and F' being screwed in said heads $e^2$, the converter being supported horizontally in the furnace, between the boiler A and grate-bar thereof, by means of its flanged ends resting in recesses $c^3$ in the walls of said furnace.

The operation of my apparatus is as follows: Air is forced by the compressor (not shown) through pipe $a^3$, which passes through the furnace, thus heating the air, to the chamber D D, where it is forced through the openings $a'\ a'$ in pipes $d^3\ d^3$, and up through the oil and charcoal, thence through the openings $d^2\ d^2$ in pipe $d'\ d'$ into the next compartment, this operation being repeated until the air reaches the last compartment, when it is forced into the pipe E, which conveys the now newly-made gas in its crude state to the converter F, through which it passes, thus subjecting it to an intense heat and thereby disassociating the elements thereof, thus fixing the gas ready for use, which may be kept in a tank until used, to which it is passed through pipe F', which passes through the chambers D D, transmitting the heat to the oil. The exhaust-steam is also utilized for this purpose by conveying it through pipe $a^2$ to the chambers D D.

Having thus fully described my invention, what I claim, and desire to secure by Letters Patent, is—

1. An oil-gas apparatus consisting of the combination of the series of connected carbureting-compartments with a furnace-chamber, an air-supply pipe to said carburetor arranged in the furnace-chamber, a vapor superheater or converter communicating with said carburetor located in said furnace-chamber, and the outlet-pipe from said converter arranged in the carbureting-compartments, as and for the purpose described.

2. An oil-gas apparatus consisting of the combination of the series of connected carbureting-compartments connected by the approximately inverted-L-shaped pipes having their upper ends perforated and their lower ends terminating in perforated arms, an air-supply pipe arranged in the furnace-chamber, a vapor superheater or converter, approximately N-shaped, filled with some porous substance and communicating with said carburetor located in said furnace-chamber, and the outlet-pipe from said converter arranged in the carbureting-compartments, substantially as shown, and for the purpose described.

In testimony whereof I affix my signature in presence of two witnesses.

LEWIS C. PARKER.

Witnesses:
G. H. SMITH,
S. F. CLARK.